(12) United States Patent
Jeon

(10) Patent No.: US 10,173,688 B2
(45) Date of Patent: Jan. 8, 2019

(54) METHOD OF DETERMINING DRIVING TENDENCY AND SYSTEM OF CONTROLLING SHIFT USING THE SAME

(71) Applicants: Hyundai Motor Company, Seoul (KR); Kia Motors Corporation, Seoul (KR)

(72) Inventor: Byeongwook Jeon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 675 days.

(21) Appl. No.: 14/555,321

(22) Filed: Nov. 26, 2014

(65) Prior Publication Data
US 2016/0039425 A1    Feb. 11, 2016

(30) Foreign Application Priority Data

Aug. 11, 2014 (KR) .................. 10-2014-0103465

(51) Int. Cl.
| | | |
|---|---|---|
| *B60W 10/04* | (2006.01) | |
| *B60W 10/10* | (2012.01) | |
| *B60W 40/09* | (2012.01) | |
| *B60W 50/08* | (2012.01) | |
| *B60W 50/00* | (2006.01) | |

(52) U.S. Cl.
CPC ............ *B60W 40/09* (2013.01); *B60W 10/04* (2013.01); *B60W 10/10* (2013.01); *B60W 50/08* (2013.01); *B60W 2050/0014* (2013.01); *B60W 2520/10* (2013.01); *B60W 2520/105* (2013.01); *B60W 2540/103* (2013.01); *B60W 2540/106* (2013.01); *B60W 2720/10* (2013.01)

(58) Field of Classification Search
CPC ...... B60W 10/04; B60W 10/10; B60W 40/09; B60W 50/08; B60W 2050/0014; B60W 2520/10; B60W 2520/105; B60W 2540/103; B60W 2540/106; B60W 2720/10

See application file for complete search history.

(56) References Cited

U.S. PATENT DOCUMENTS

| | | | |
|---|---|---|---|
| 5,152,192 A | 10/1992 | Koenig et al. | |
| 2012/0029801 A1 | 2/2012 | Yano et al. | |

FOREIGN PATENT DOCUMENTS

| | | | |
|---|---|---|---|
| CN | 101038181 A | 9/2007 | |
| CN | 103221665 A | 7/2013 | |
| JP | 3446438 B2 | 7/2003 | |
| JP | 2005-178534 A | 7/2005 | |
| JP | 2007-148917 A | 6/2007 | |
| JP | 2012-33107 A | 2/2012 | |
| KR | 10-2009-0014551 A | 2/2009 | |
| KR | 10-2009-0070041 A | 7/2009 | |
| KR | 10-2011-0129145 A | 12/2011 | |

*Primary Examiner* — Edwin A Young
(74) *Attorney, Agent, or Firm* — Morgan, Lewis & Bockius LLP

(57) ABSTRACT

A method of determining a driving tendency and a system of controlling shift using the same are disclosed. A system of controlling shift for a vehicle may include: a data detector detecting data for a shift control; and a controller determining a short term driving tendency index and a long term driving tendency index, and controlling an engine or a transmission according to the long term driving tendency index, wherein the controller determines the short term driving tendency when an accelerator pedal position reaches a predetermined position value while the vehicle is coasting.

6 Claims, 9 Drawing Sheets

METHOD OF DETERMINING DRIVING TENDENCY AND SYSTEM OF CONTROLLING SHIFT USING THE SAME

CROSS-REFERENCE TO RELATED APPLICATION

The present application claims priority to and the benefit of Korean Patent Application No. 10-2014-0103465 filed on Aug. 11, 2014, the entire contents of which is incorporated herein for all purposes by this reference.

BACKGROUND OF THE INVENTION

Field of the Invention

The present invention relates a method of determining a driving tendency and a system of controlling shift using the same. More particularly, the present invention relates to a method of determining a driving tendency and a system of controlling shift using the same that reflects a will of a driver on the shift precisely by determining a driving tendency further precisely.

Description of Related Art

Driver satisfaction related to driving performance of a vehicle depends on how precisely the vehicle runs in accordance with a tendency of the driver. While tendencies of the drivers vary, however, performance characteristic of the vehicle is set to one performance characteristic in the same vehicle model. Therefore, reaction of the vehicle may not coincide with the tendency of the driver.

Accordingly, the driver often lodges a complaint against the driving performance of the vehicle. That is, if the driving tendency of the customer driver is grasped and a shift of the vehicle is controlled to coincide with the tendency of the driver, the driver satisfaction related to the driving performance may be maximized.

Therefore, many methods of learning the driving tendency of the customer for a long time and controlling the shift according to the learned driving tendency have been developed. The method of controlling the shift according to the learned driving tendency is performed under the assumption that the driving tendency of the driver is constant.

The driving tendency of the driver, however, is not constant and changes according to temporary changes of driver's feeling or driving will, road condition and so on. Therefore, the learned driving tendency may differ greatly from an actual driving tendency of the driver at one point. If the shift controlled according to the learned driving tendency, the actual driving will of the driver may not be reflected on the shift and the driver may dissatisfy with the driving performance.

As main parameters for determining driving tendency, an accelerator pedal position and a change rate of the accelerator pedal position has been mainly used in the related art.

However, even though a situation of operating the accelerator pedal is an important reference for determining a driver's acceleration will, there is a limitation to reflect an actual will of the driver. Therefore, in order to determine the driving tendency, a more reasonable determination reference is required rather than the accelerator pedal position.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of determining a driving tendency and a system of controlling shift using the same having advantages of reflecting a will of a driver on the shift further precisely by precisely determining a short term driving tendency of the driver that is a driving tendency for a short time (e.g., for a current driving or for a predetermined time in the current driving).

A method of determining a driving tendency according to an exemplary embodiment of the present invention may include: determining whether an accelerator pedal position increases from 0 to a predetermined position value; checking a vehicle speed at a time at which the accelerator pedal position reaches the predetermined position value if the accelerator pedal position reaches the predetermined position value; determining whether the vehicle speed increases to a predetermined speed value; checking an elapsed time from a time at which the accelerator pedal position reaches the predetermined position value to a time at which the vehicle speed reaches the predetermined speed value if the vehicle speed reaches the predetermined speed value; and calculating a short term driving tendency index based on the elapsed time.

The calculating the short term driving tendency based on the elapsed time may include calculating the short term driving tendency based on the elapsed time and a function having the elapsed time as a variable.

The determining whether the vehicle speed increases to the predetermined speed value may include calculating the predetermined speed value by adding a reference speed increment amount to the vehicle speed at the time at which the accelerator pedal position reaches the predetermined position value, and the reference speed increment amount is determined a value that decreases as the vehicle speed increases.

The method may further include comparing the elapsed time with a determination limit time, wherein the short term driving tendency index is not calculated if the elapsed time is greater than or equal to the determination limit time.

The method may further include determining whether a gradient of a road is within a predetermined range, and wherein the short term driving tendency index is not calculated if the gradient of the road is not within the predetermined range.

The method may further include calculating a long term driving tendency index by averaging the short term driving tendency indexes for a predetermined time.

A method of determining a driving tendency another exemplary embodiment of the present invention may include: determining whether an accelerator pedal position increases from 0 to a predetermined position value; checking a vehicle acceleration at a time at which the accelerator pedal position reaches the predetermined position value and counting an elapsed time after the accelerator pedal position reaches the predetermined position value if the accelerator pedal position reaches to the predetermined position value; determining whether the elapsed time reaches a predetermined time; checking the vehicle acceleration at a time at which the elapsed time reaches the predetermined time if the elapsed time reaches the predetermined time; calculating an acceleration increment amount by subtracting the vehicle acceleration at the time at which the accelerator pedal position reaches the predetermined value from the vehicle acceleration at the time at which the elapsed time reaches the predetermined time; and calculating a short term driving tendency based on the acceleration increment amount.

The calculating the short term driving tendency based on the acceleration increment amount may include: calculating a corrected acceleration increment amount by correcting the acceleration increment amount; and calculating the short term driving tendency based on the corrected acceleration increment amount and a function having the corrected acceleration increment amount as a variable, and the corrected acceleration increment amount is calculated by multiplying a filter coefficient set according to the vehicle speed to the acceleration increment amount.

The method may further include determining whether a gradient of a road is within a predetermined range, and wherein the short term driving tendency index is not calculated if the gradient of the road is not within the predetermined range.

The method may further include calculating a long term driving tendency index by averaging the short term driving tendency indexes for a predetermined time.

A system of controlling shift for a vehicle according to an exemplary embodiment of the present invention may include: a data detector detecting data for a shift control; and a controller calculating a shot term driving tendency index and a long term driving tendency index, and controlling an engine or a transmission according to the long term driving tendency index, wherein the controller calculates the short term driving tendency if an accelerator pedal position reaches a predetermined position value while the vehicle is coasting.

If a vehicle speed reaches a predetermined speed value, the controller may check an elapsed time from a time at which the accelerator pedal position reaches the predetermined position to a time at which the vehicle speed reaches the predetermined speed value and calculate the short term driving tendency index based on the elapsed time.

The controller may calculate the predetermined speed value by adding a reference speed increment amount to the vehicle speed at the time at which the accelerator pedal position reaches the predetermined position value, and the reference speed increment amount is determined a value that decreases as the vehicle speed increases.

The controller may do not calculate the short term driving tendency index if the elapsed time is greater than or equal to a determination limit time.

The controller may count an elapsed time after the accelerator pedal position reaches the predetermined position value, if the elapsed time reaches a predetermined time, calculate an acceleration increment amount by subtracting a vehicle acceleration at a time at which the accelerator pedal position reaches the predetermined position value from the vehicle acceleration at a time at which the elapsed time reaches the predetermined time, and calculate the short term driving tendency index based on the acceleration increment amount.

The controller may calculate a corrected acceleration increment amount by multiplying a filter coefficient set according to the vehicle speed to the acceleration increment amount and calculate the short term driving tendency based on the corrected acceleration increment amount.

The controller may do not calculate the short term driving tendency index if a gradient of a road is not within a predetermined range.

The short term driving tendency of the driver can be determined precisely according to an exemplary embodiment of the present invention. Therefore, a will of the driver can be reflected on the shift precisely.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
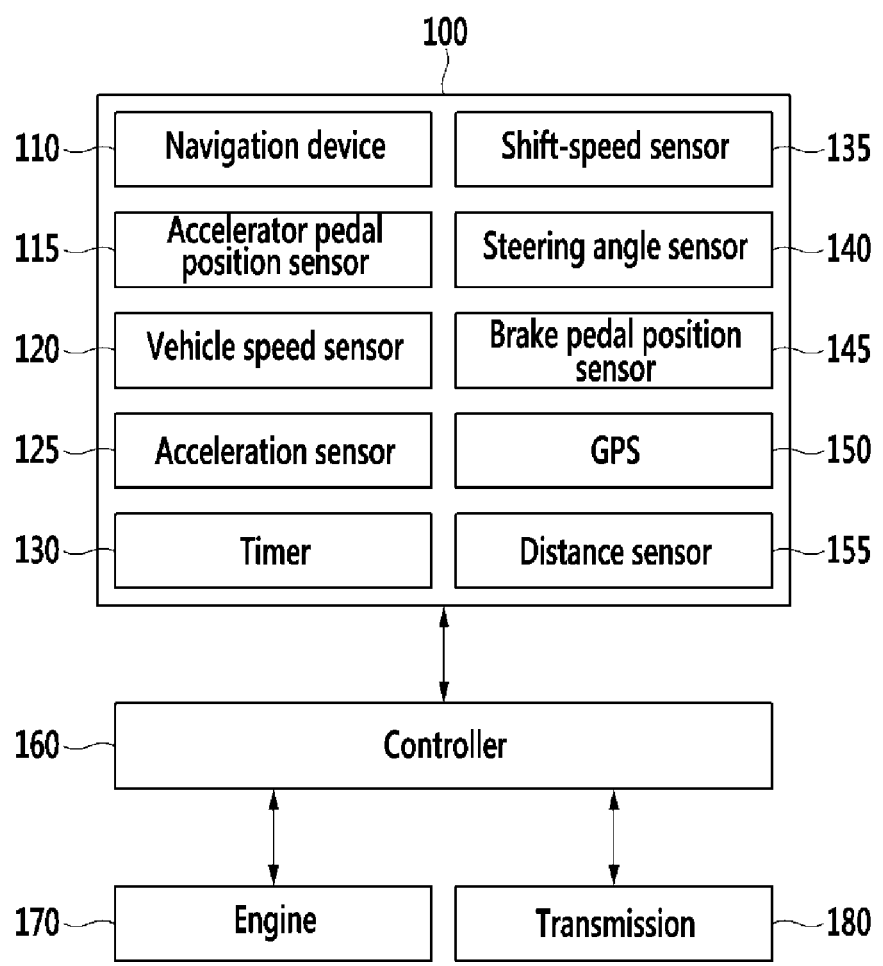
FIG. 1 is a block diagram of a system of controlling shift according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an operation principle of a method of determining a driving tendency and a system of controlling a shift using the same according to an exemplary embodiment of the present invention will be described in detail with reference to the accompanying drawings. However, the attached drawings and a detailed description to be given later relate to an exemplary embodiment of several exemplary embodiments for effectively describing a characteristic of the present invention. Therefore, the present invention is not limited to only the following drawings and description.

In addition, detailed descriptions of well-known functions and structures incorporated herein may be omitted to avoid obscuring the subject matter of the present invention. The terms used herein are defined according to the functions of the present invention, and may vary depending on a user's or an operator's intension and usage. Therefore, the terms used herein should be understood based on the descriptions made herein.

Further, in order to effectively describe technical characteristics of the present invention, the following exemplary embodiment may appropriately change, integrate, or separate terms to be clearly understood by a person of ordinary skill in the art, and the present invention is not limited thereto.

Hereinafter, an exemplary embodiment of the present invention will be described in detail with reference to the accompanying drawings.

FIG. 1 is a block diagram of a system of controlling shift according to an exemplary embodiment of the present invention.

As shown in FIG. 1, a system of controlling shift according to an exemplary embodiment of the present invention includes a data detector 100, a controller 160, an engine 170 and a transmission 180.

The data detector 100 detects data for determining a driving tendency of a driver, and the data detected by the data detector 100 is transmitted to the controller 160. The data detector 100 may include a navigation device 110, an accelerator pedal position sensor 115, a vehicle speed sensor 120, an acceleration sensor 125, a timer 130, a shift-speed sensor 135, a steering angle sensor 140, a brake pedal position sensor 145, a global positioning system (GPS) and a distance sensor 155.

The navigation device 110 is a device whish informs the driver of a route to a destination. The navigation device 110 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route.

However, it is sufficient in an exemplary embodiment of the present invention that the navigation device 110 can provide information on a road shape such as a gradient of a road or a curvature radius of the road to the controller 160. Therefore, it is to be understood that the navigation device 110 includes any device which can provide the information on the road shape to the controller 160 in this specification and the claims.

The accelerator pedal position sensor 115 detects a degree with which the driver pushes an accelerator pedal. That is, the accelerator pedal position sensor 115 detects the data related to driver's acceleration will. If the accelerator pedal is pushed completely an accelerator pedal position is 100%, and if the accelerator pedal is not pushed the accelerator pedal position is 0%.

The vehicle speed sensor 120 detects a vehicle speed, and is mounted at a wheel of the vehicle. On the contrary, the vehicle speed may be calculated based on a GPS signal received by the GPS 150.

Meanwhile, a target shift-speed may be calculated by using a shift pattern based on the signal of the accelerator pedal position sensor 115 and the signal of the vehicle speed sensor 120, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

In addition, an engine torque may be calculated based on the signal of the accelerator pedal position sensor 115 and the target shift-speed, and the engine 30 is controlled according to the calculated engine torque.

The acceleration sensor 125 detects a vehicle acceleration. The acceleration sensor 125 may be mounted in addition to the vehicle speed sensor 120 and may directly detects the vehicle acceleration, or the vehicle acceleration may be calculated by differentiating the vehicle speed detected by the vehicle speed sensor 120.

The timer 130 detects an elapsed time after a particular time. The particular time may be a time at which the accelerator pedal position reaches a predetermined position value while the vehicle is coasting.

The shift-speed sensor 135 detects a shift-speed that is currently engaged.

The steering angle sensor 140 detects a steering angle of the vehicle. That is, the steering angle sensor 140 detects a direction to which the vehicle runs.

The brake pedal position sensor 145 detects whether a brake pedal is pushed or not. That is, the brake pedal position sensor 145 as well as the accelerator pedal position sensor 115 detects the driver's acceleration will.

The GPS 150 receives a signal transmitted from a GPS satellite and transmits a signal corresponding thereto to the navigation device 110.

The distance sensor 155 detects a distance between the vehicle of the driver and a preceding vehicle. Various sensors such as an ultrasonic wave sensor and an infrared sensor may be used as the distance sensor 155.

The controller 160 determines the driving tendency of the driver based on the data detected by the data detector 100. For these purposes, the controller 160 may be realized by one or more processors activated by a predetermined program, and the predetermined program may be programmed to perform each step of a method of determining driving tendency according to an exemplary embodiment of the present invention.

The controller 160 includes a short term driving tendency index calculator, a memory and a long term driving tendency index calculator.

The short term driving tendency index calculator determines the short term driving tendency of the driver for a comparatively short time based on the data detected by the data detector 100. That is, the short term driving tendency index calculator determines the driving tendency of the driver, for example, during a current driving or for a predetermined time in the current driving. The short term driving tendency of the driver may be determined based on how well one or more assumptions related to the driving tendency of the driver are satisfied, and fuzzy control theory may be used to determine the short term driving tendency of the driver. The short term driving tendency of the driver determined by the short term driving tendency index calculator is calculated as a short term driving tendency index, and the short term driving tendency index is transmitted to and is stored in the memory.

The memory stores the short term driving tendency index calculated by the short term driving tendency index calculator.

The long term driving tendency index calculator determines the long term driving tendency of the driver from a plurality of the short term driving tendency indexes stored in the memory. The long term driving tendency of the driver determined by the long term driving tendency index calculator is calculated as a long term driving tendency index.

Meanwhile, the controller 160 can determine a condition of a road on which the vehicle runs currently based on the data detected by the data detector 100. The road condition includes a specific road state such as an icy road, a slippery road, a rough road and an unpaved road, a specific road shape such as a curve road and an inclined road, and a congested degree. If the road condition shows the specific road state, the specific road shape or the congested road, it is general that the vehicle runs not according to the driving tendency of the driver but according to the road condition. Therefore, the driving tendency of the driver can be precisely determined by not calculating the short term driving tendency of the driver under the specific road condition.

On the contrary, the short term driving tendency of the driver may be calculated under the specific road condition. In this case, a strong filter is applied to the short term driving tendency of the driver calculated under the specific road condition.

The controller 160 controls the engine 170 or the transmission 180 according to the long term driving tendency index. That is, the controller 160 may change a shift pattern, engaging feeling to the target shift-speed, an engine torque map and/or an engine torque filter according to the long term driving tendency index.

A driving of the engine 170 is controlled to an optimal driving point according to the control of the controller 160.

A shift ratio of the transmission 180 is controlled according to the control of the controller 160. The transmission 180 delivers the engine torque to the driving wheel to drive the vehicle.

Hereinafter, referring to FIG. 2 to FIG. 5, a method of determining a driving tendency according to an exemplary embodiment of the present invention will be described in detail.

Figure 2:
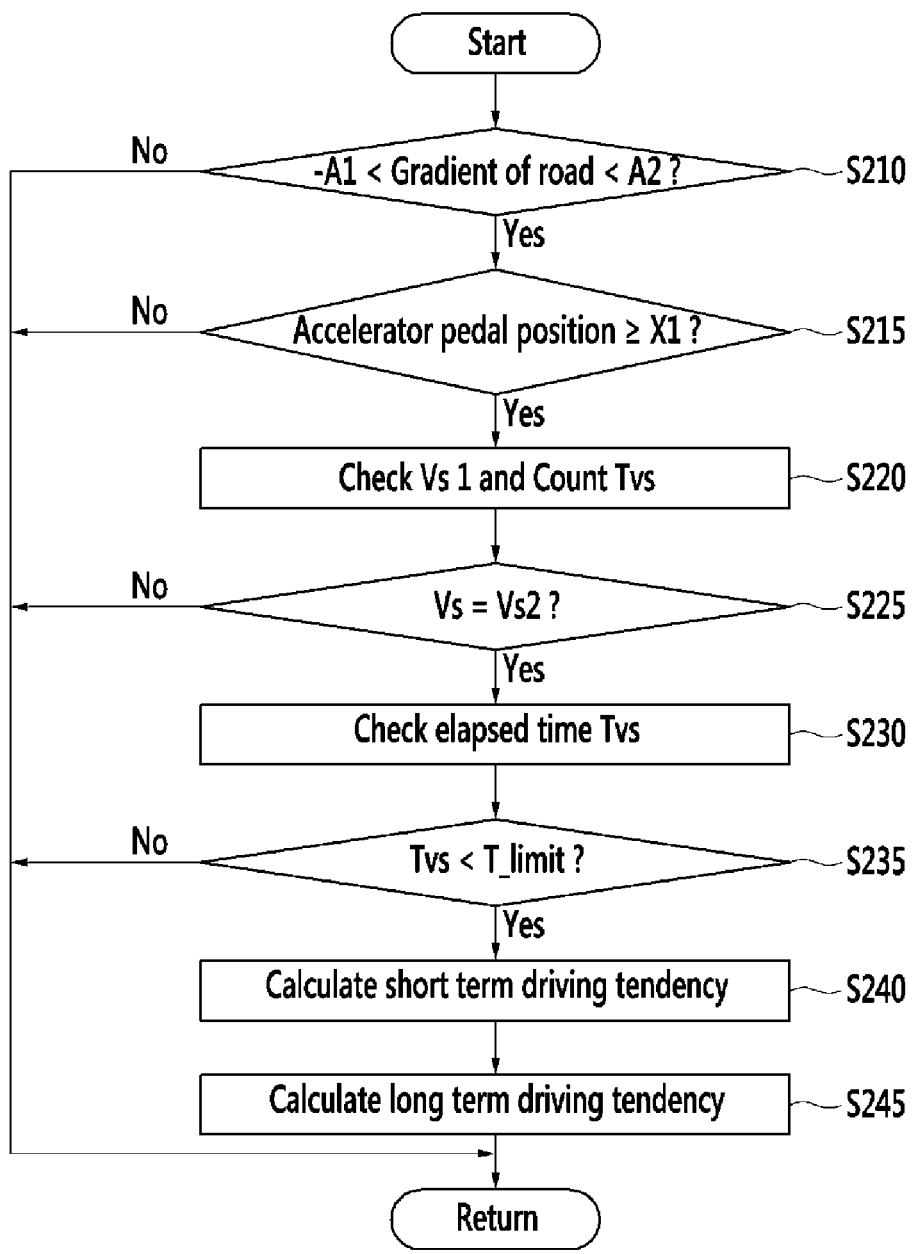
FIG. 2 is a flowchart of a method of determining a driving tendency according to an exemplary embodiment of the present invention.
Figure 3:
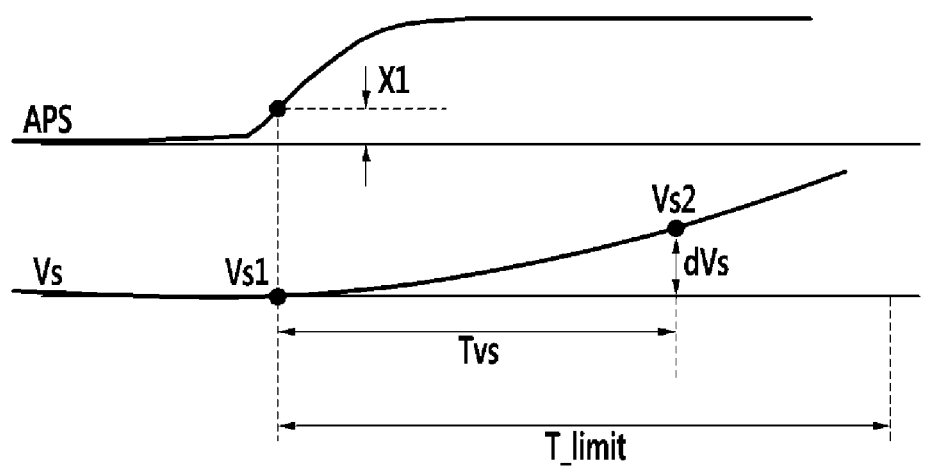
FIG. 3 is a graph for explaining determination of a driving tendency according to an exemplary embodiment of the present invention.
Figure 4:
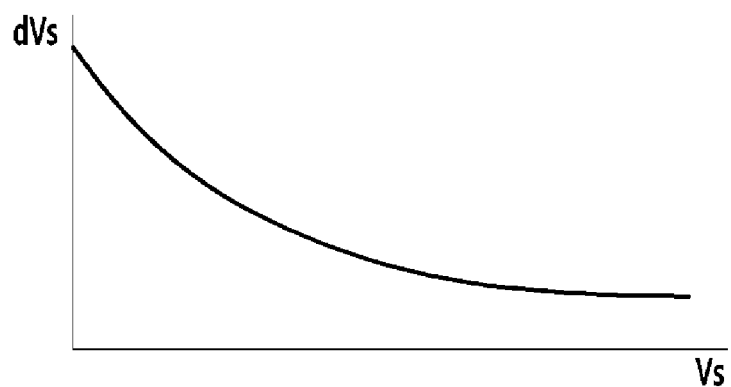
FIG. 4 is a graph showing a reference speed increment amount according to an exemplary embodiment of the present invention.
Figure 5:
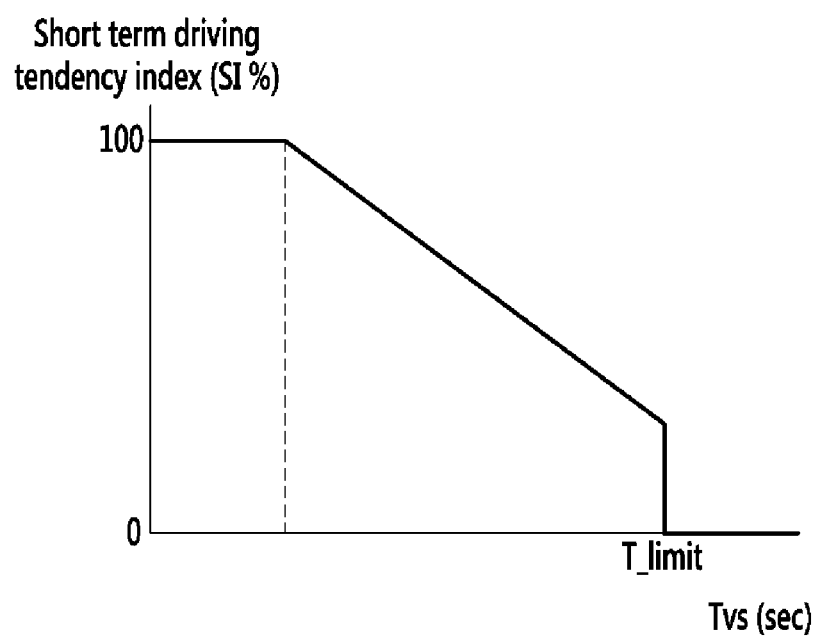
FIG. 5 is a graph showing a function having an elapsed time as a variable according to an exemplary embodiment of the present invention.

FIG. 2 is a flowchart of a method of determining a driving tendency according to an exemplary embodiment of the present invention, FIG. 3 is a graph for explaining determination of a driving tendency according to an exemplary embodiment of the present invention, FIG. 4 is a graph showing a reference speed increment amount according to an exemplary embodiment of the present invention, and FIG. 5 is a graph showing a function having an elapsed time as a variable according to an exemplary embodiment of the present invention.

Referring FIG. 2 to FIG. 5, the controller 160 determines whether a gradient of a road is within a predetermined rage at step S210. In detail, if the gradient of the road is greater than a first predetermined gradient −A1 and less than a second predetermined gradient A2, the controller 160 may determine that the vehicle runs on a flat road.

If the gradient of the road is not within the predetermined range, it is general the vehicle runs not according to the driving tendency of the driver but according to the gradient of the road. Therefore, if the gradient of the road is not within the predetermined range, the driving tendency of the driver can be precisely determined by not calculating the short term driving tendency index.

If the gradient of the road is within the predetermined range, the controller 160 determines whether the accelerator pedal position APS increases from 0 to a predetermined position value X1 at step S215. That is, the controller 160 determines the short term driving tendency of the driver if the driver pushes the accelerator pedal while the vehicle is coasting. The predetermined position value X1 may be set to a value in which a person of an ordinary skill in the art preferably determines.

If the accelerator pedal position APS does not reach to the predetermined position value X1 at step S215, the controller 160 finishes the method of determining the driving tendency according to the exemplary embodiment of the present invention.

If the accelerator pedal position APS reaches the predetermined position value X1 at step S215, the controller 160 checks a vehicle speed Vs1 at a time at which the accelerator pedal position APS reaches the predetermined position value X1, and then counts an elapsed time Tvs after the accelerator pedal position APS reaches the predetermined position value X1 at step S220.

The controller 160 determines whether the vehicle speed Vs increases to a predetermined speed value Vs2 at step S225. The controller 160 may calculate the predetermined speed value Vs2 by adding a reference speed increment amount dVs to the vehicle speed Vs1. As shown in FIG. 4, the reference speed increment amount dVs may be determined a value that decreases as the vehicle speed Vs increases. That is, the reference speed increment amount dVs may be set to be sensitive to an increase of the vehicle speed Vs when the vehicle runs at a high speed.

If the vehicle speed Vs does not increase to the predetermined speed value Vs2 at step S225, the controller 160 finishes the method of determining the driving tendency according to an exemplary embodiment of the present invention.

If the vehicle speed Vs reaches the predetermined speed value Vs2 at step S225, the controller 160 checks the elapsed time Tvs from a time at which the accelerator pedal position APS reaches the predetermined position value X1 to a time at which the vehicle speed Vs reaches the predetermined speed value Vs2 at step S230.

After that, the controller 160 compares the elapsed time Tvs with a determination limit time T_limit at step S235. That is, the controller 160 determines whether the vehicle speed Vs reaches the predetermined speed value Vs2 within the determination limit time T_limit. The determination limit time T_limit may be set to a value in which a person of an ordinary skill in the art preferably determines.

If the elapsed time Tvs is greater than or equal to the determination time T_limit, the controller 160 finishes the method of determining the driving tendency according to an exemplary embodiment of the present invention. If the elapsed time Tvs is greater than or equal to the determination limit time T_limit, the elapsed time Tvs is not a valid value for determining the short term driving tendency. Therefore, if the elapsed time Tvs is greater than or equal to the determination limit time T_limit, the driving tendency of the driver can be precisely determined by not calculating the short term driving tendency index.

If the elapsed time Tvs is less than the determination limit time T_limit at step S235, the controller 160 calculates the short term driving tendency based on the elapsed time Tvs and a function having the elapsed time as a variable (referring to FIG. 5) at step S240. In FIG. 5, x-axis represents the elapsed time Tvs and y-axis represents the short term driving tendency index The short term driving tendency changes according to the elapsed time Tvs. The closer to 0% the short term driving tendency index is, the more the driver has a mild driving tendency (does not increase speed quickly) in FIG. 5. On the contrary, the closer to 100% the short term driving tendency index is, the more the driver has a sporty driving tendency (often increases speed quickly) in FIG. 5. That is, the shorter the elapsed time Tvs, the more the driver has the sporty driving tendency. On the contrary, the longer the elapsed time Tvs, the more the driver has the mild driving tendency.

The controller 160 may calculate the long term driving tendency index by averaging the short term driving tendency indexes for a predetermined time at step S245.

Hereinafter, referring to FIG. 6 to FIG. 9, a method of determining a driving tendency according to another exemplary embodiment of the present invention will be described in detail.

Figure 6:
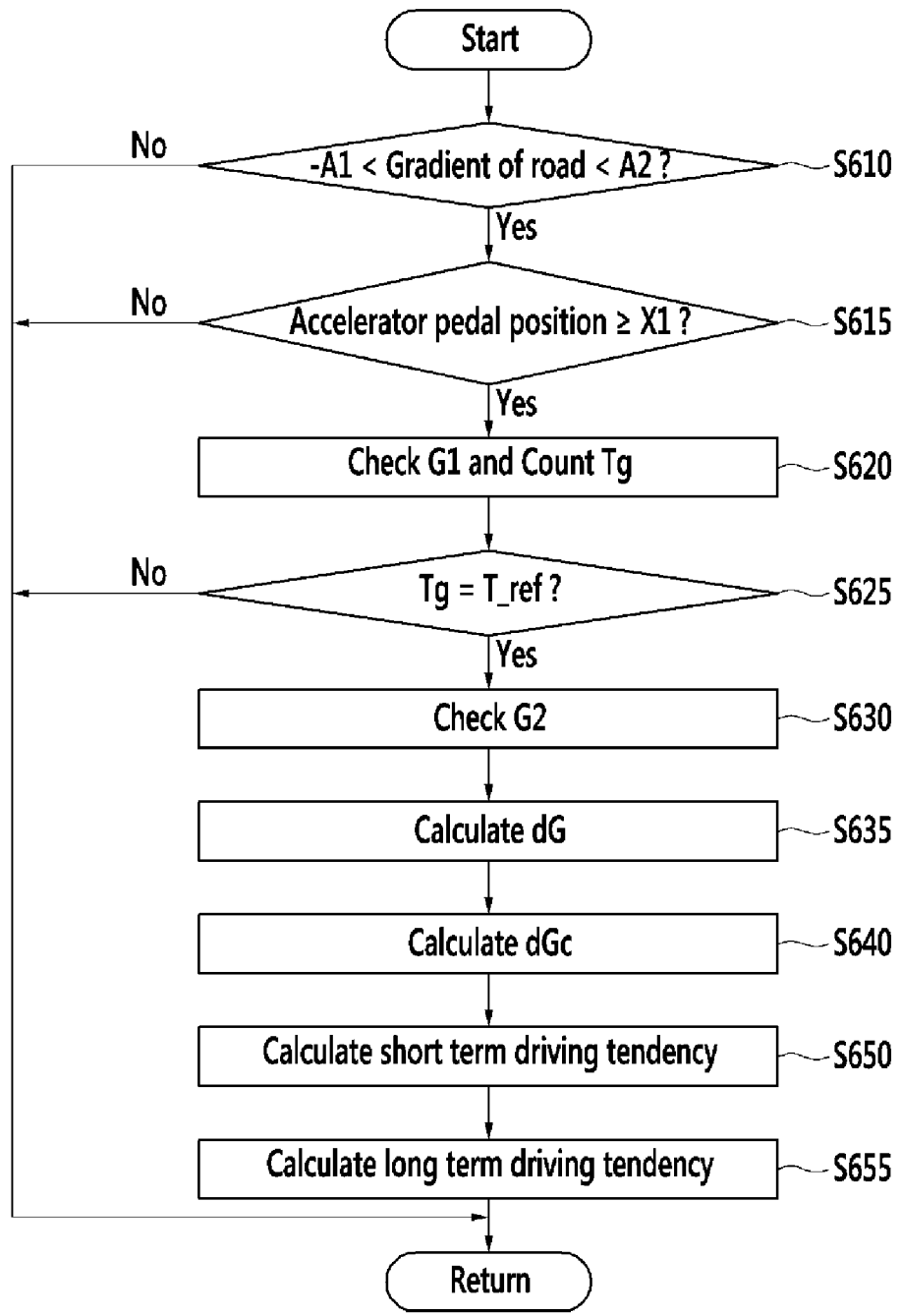
FIG. 6 is a flowchart of a method of determining a driving tendency according to another exemplary embodiment of the present invention.
Figure 7:
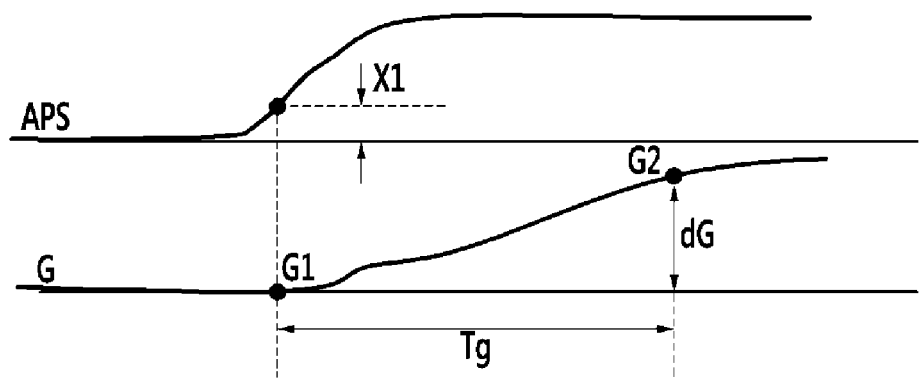
FIG. 7 is a graph for explaining determination of a driving tendency according to another exemplary embodiment of the present invention.
Figure 8:
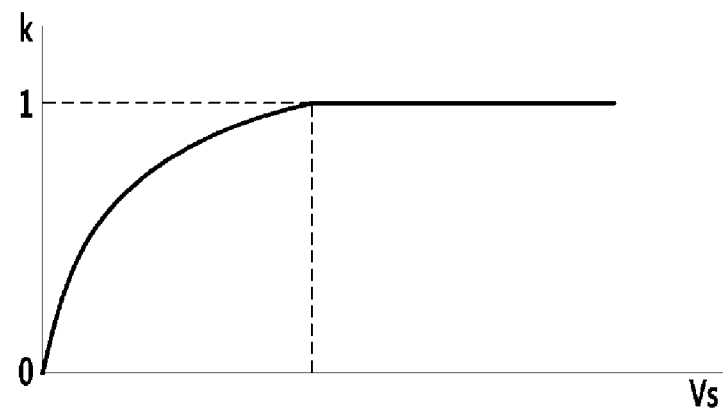
FIG. 8 is a graph showing a filter coefficient according to another exemplary embodiment of the present invention.
Figure 9:
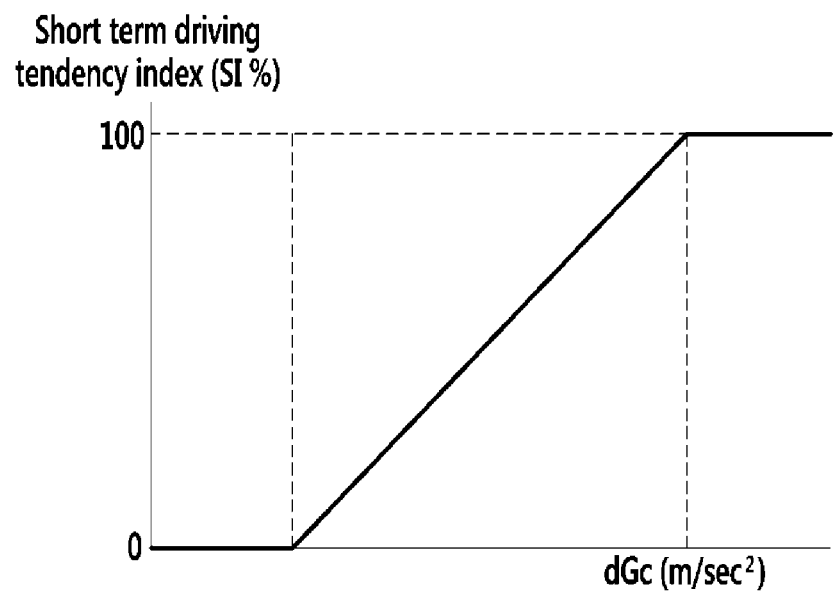
FIG. 9 is a graph showing a function having an acceleration increment amount as a variable according to another exemplary embodiment of the present invention.

FIG. 6 is a flowchart of a method of determining a driving tendency according to another exemplary embodiment of the present invention, FIG. 7 is a graph for explaining determination of a driving tendency according to another exemplary embodiment of the present invention, FIG. 8 is a graph showing a filter coefficient according to another exemplary embodiment of the present invention, and FIG. 9 is a graph showing a function having an acceleration increment amount as a variable according to another exemplary embodiment of the present invention.

Referring to FIG. 6 to FIG. 9, the controller 160 determines whether the gradient of the road is within the predetermined range at step S610. In detail, if the gradient of the road is greater than the first predetermined gradient −A1% and less than a second predetermined gradient A2%, the controller 160 may determine that the vehicle runs on a flat road.

If the gradient of the road is not within the predetermined range, it is general that the vehicle runs not according to the driving tendency of the driver but according to the gradient of the road. Therefore, if the gradient of the road is not within the predetermined range, the driving tendency of the driver can be precisely determined by not calculating the short term driving tendency index.

If the gradient of the road is within the predetermined range, the controller 160 determines whether the accelerator pedal position APS increases from 0 to a predetermined position value X1 at step S615. That is, the controller 160 determines the short term driving tendency of the driver if the driver pushes the accelerator pedal while the vehicle is coasting.

If accelerator pedal position does not increase to the predetermined position value X1 at step S615, the controller 160 finishes the method of determining the driving tendency according to the exemplary embodiment of the present invention.

If the accelerator pedal position APS reaches the predetermined position value X1 at step S615, the controller 160 checks a vehicle acceleration G1 at a time at which the accelerator pedal position APS reaches the predetermined position value X1, and then counts an elapsed time Tg after the accelerator pedal position APS reaches the predetermined position value X1 at step S620.

The controller 160 determines whether the elapsed time Tg reaches a predetermined time T_ref at step S625. The predetermined time Tg may be set to a value in which a person of an ordinary skill in the art preferably determines.

If the elapsed time Tg reaches the predetermined time T_ref at step S625, the controller 160 checks a vehicle acceleration G2 at a time at which the elapsed time Tg reaches the predetermined time T_ref at step S630.

The controller 160 calculates an acceleration increment amount dG by subtracting the vehicle acceleration G1 from the vehicle acceleration G2 at step S635.

The controller 160 may calculates a corrected acceleration increment amount dGc by correcting the acceleration increment amount dG at step S640. The corrected acceleration increment amount dGc may be calculated by multiplying a filter coefficient k set according to the vehicle speed to the acceleration increment amount dG (i.e., dGc=k×dG). As shown in FIG. 8, the filter coefficient k may be determined a value that increases as the vehicle speed Vs increases. That is, the corrected acceleration increment amount dGc may be set to be less sensitive to an increase of the vehicle speed Vs when the vehicle runs at a low speed and be set to be sensitive to the increase of the vehicle speed Vs when the vehicle runs at a high speed.

The controller 160 calculates the short term driving tendency based on the corrected acceleration increment amount dGc and a function having the corrected acceleration increment amount dGc as a variable (referring FIG. 9) at step S650. In FIG. 9, x-axis represents the corrected acceleration increment amount dGc and y-axis represents the short term driving tendency index. The short term driving tendency changes according to the corrected acceleration increment amount dGc. The closer to 0% the short term driving tendency index is, the more the driver has a mild driving tendency (does not increase speed quickly) in FIG. 9. On the contrary, the closer to 100% the short term driving tendency index is, the more the driver has a sporty driving tendency (often increases speed quickly) in FIG. 5. That is, the lower the corrected acceleration increment amount dGc, the more the driver has the mild driving tendency. On the contrary, the higher the corrected acceleration increment amount, the more the driver has the sporty driving tendency.

The controller 160 may calculate the long term driving tendency index by averaging the short term driving tendency indexes for a predetermined time at step S655.

As described above, the short term driving tendency of the driver can be determined precisely according to an exemplary embodiment of the present invention. Therefore, a will of the driver can be reflected on the shift precisely.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A method of determining a driving tendency, comprising:
    determining, by a controller, whether an accelerator pedal position increases from 0 to a predetermined position value;
    checking, by the controller, a vehicle speed at a time at which the accelerator pedal position reaches the predetermined position value;
    determining, by the controller, whether the vehicle speed increases to a predetermined speed value;
    checking, by the controller, an elapsed time from the time at which the accelerator pedal position reaches the predetermined position value to a time at which the vehicle speed reaches the predetermined speed value;
    determining, by the controller, a short term driving tendency index based on the elapsed time; and
    controlling, by the controller, an engine or a transmission according to the short term driving tendency index.

2. The method of claim 1, wherein the determining the short term driving tendency based on the elapsed time includes determining the short term driving tendency based on the elapsed time and a function having the elapsed time as a variable.

3. The method of claim 1, wherein the determining of whether the vehicle speed increases to the predetermined speed value includes determining the predetermined speed value by adding a reference speed increment amount to the vehicle speed at a time at which the accelerator pedal position reaches the predetermined position value, and the reference speed increment amount is determined a value that decreases as the vehicle speed increases.

4. The method of claim 1, further comprising comparing the elapsed time with a determination limit time, wherein the short term driving tendency index is not determined when the elapsed time is greater than or equal to the determination limit time.

5. The method of claim 1, further comprising determining whether a gradient of a road is within a predetermined range, and wherein the short term driving tendency index is not determined when the gradient of the road is not within the predetermined range.

6. The method of claim 1, further comprising determining a long term driving tendency index by averaging the short term driving tendency indexes for a predetermined time and controlling, by the controller, the engine or the transmission according to the long term driving tendency index.

\* \* \* \* \*